United States Patent [19]

Barthel et al.

[11] Patent Number: 5,686,054

[45] Date of Patent: Nov. 11, 1997

[54] PROCESS FOR THE SILYLATION OF INORGANIC OXIDES

[75] Inventors: Herbert Barthel, Emmerting; Mario Heinemann, Burghausen; Franz Herrmann, Emmerting; August Altenbuchner, St. Radegund, all of Germany

[73] Assignee: Wacker-Chemie GmbH, Munich, Germany

[21] Appl. No.: 442,452

[22] Filed: May 16, 1995

[30] Foreign Application Priority Data

Jun. 1, 1994 [DE] Germany ............... 44 19 234.7

[51] Int. Cl.$^6$ .............. C01B 33/12; C01F 7/02; C01G 23/047

[52] U.S. Cl. .......... 423/335; 423/592; 423/610; 423/625; 423/659

[58] Field of Search .................. 423/335, 610, 423/625, 592, 659

[56] References Cited

U.S. PATENT DOCUMENTS

| | | |
|---|---|---|
| 3,830,738 | 8/1974 | Cottrell . |
| 3,963,627 | 6/1976 | Cottrell . |
| 4,015,031 | 3/1977 | Reinhardt et al. . |
| 4,036,933 | 7/1977 | Läufer et al. ............ 423/335 |
| 4,108,964 | 8/1978 | Kratel et al. . |
| 4,902,570 | 2/1990 | Heinemann et al. . |
| 5,153,030 | 10/1992 | Chatfield et al. . |
| 5,277,888 | 1/1994 | Baron et al. ............ 423/335 |
| 5,366,938 | 11/1994 | Deller et al. ............ 423/610 |
| 5,614,177 | 3/1997 | Persello ............ 423/335 |

FOREIGN PATENT DOCUMENTS

| | | |
|---|---|---|
| 579049 | 1/1994 | European Pat. Off. . |
| 2078599 | 11/1971 | France . |
| 2305390 | 10/1976 | France . |
| 2639352 | 5/1990 | France . |
| 1163784 | 2/1964 | Germany . |
| 1916360 | 10/1970 | Germany . |
| 2107082 | 8/1971 | Germany . |
| 2024443 | 12/1971 | Germany . |
| 2057731 | 8/1972 | Germany . |
| 2344388 | 3/1975 | Germany . |
| 2403783 | 8/1975 | Germany . |
| 2513608 | 10/1976 | Germany . |
| 2620737 | 12/1977 | Germany . |
| 2728490 | 1/1979 | Germany . |
| 3211431 | 9/1983 | Germany . |
| 3707226 | 9/1988 | Germany . |
| 4221716 | 1/1994 | Germany . |

OTHER PUBLICATIONS

English Derwent abstract AN 94–008697/02.
English Derwent abstract AN 75–17818W/11.
English Derwent abstract AN 71–55550S/34.
English Derwent Abstract AN 83–777868/40.
English Derwent abstract AN 70–71764R/39.
English Derwent abstract AN 76–77771X/42.
English Derwent abstract AN 75–55793W/34.
English Derwent abstract AN 79–06170B/04.
English Derwent abstract AN 72–36420T/23.
George W. Sears "Determination of Specific Surface Area of Colloidal Silica by Titration with Sodium Hydroxide", Anal.Chem. 1956, 12, 1981.
Patent Abstracts of Japan JP 6016971.
English Derwent Abstract AN 71–76767S/49.
Sworn English Translation of EP 0 579 049.

Primary Examiner—Wayne Langel

[57] ABSTRACT

The invention relates to a process for the silylation of very finely divided inorganic oxides, in which the very finely divided inorganic oxides are treated with at least one silylating agent which is relatively nonvolatile in the temperature range of the overall process, with the proviso that the relatively nonvolatile silylating agent is admixed with the very finely divided inorganic oxides as a liquid, in the form of a very finely atomized aerosol. Furthermore, the invention relates to a highly apolar, pyrogenic silica prepared by this process.

9 Claims, No Drawings

PROCESS FOR THE SILYLATION OF INORGANIC OXIDES

FIELD OF THE INVENTION

The present invention relates to highly apolar inorganic oxides such as silica, to a process for the preparation of highly apolar inorganic oxides and to their use.

BACKGROUND OF INVENTION

The use of inorganic oxides, for example silica, as thickeners and thixotropic agents in liquids is known. The thickening and thixotropic effect can be explained by the establishment of a three-dimensional network of silica particles within the liquid. For the development and stability of the network in the liquid, it is the interactions between the silanol groups of neighboring silica particles, for example via the formation of hydrogen bonds, which are critical. In apolar liquids these interactions have their full effect. The action of silica as a thickener of liquids is therefore particularly well pronounced in apolar systems or systems of low polarity, such as hydrocarbons or polydimethylsiloxanes. In media having a high affinity for the silanol groups of the silica surface, for example via hydrogen bonds, destabilization of the three-dimensional silica network occurs. For this reason, the thickening of highly polar liquids such as water or ethanol is only possible with large quantities of silica. Polar systems such as solvents, polymers or resins which comprise oxygen-containing polar groups, for example keto, epoxy, ether, ester, hydroxyl or carboxyl groups, or nitrogen-containing polar groups, for example primary, secondary or tertiary amino, amido, imino groups or quaternary ammonium groups, are of great industrial importance—examples being epoxy resins, polyurethanes, vinyl ester resins or aqueous dispersions and emulsions—as paints, coating compositions or adhesives. In order to suppress the destabilizing effect of the silanol groups of the silica surface on the development of the three-dimensional particle network, attempts are made to thicken such systems and to render them thixotropic using apolar silicas, i.e., those silicas whose content of surface silanol groups is reduced. However, the success of such attempts is highly variable and appears to be dependent on the system.

One object of the present invention is the effective elimination of the silanol groups on the silica surface, that is, the complete silylation of the silica, since these silanol groups in polar systems, destabilize the three-dimensional particle network which is necessary for thickening and thixotropy.

Processes for the preparation of apolar silicas are known.

DE-B 11 63 784 (Deutsche Gold- und Silber-Scheideanstalt) and DE 32 11 431 (Degussa AG), disclose processes for the silylation of silica. In the processes described in these documents, silica which has silanol groups on its surface is dried in a dry stream of inert gas at temperatures of from 600° C. to 1000° C., preferably from 800° C. to 900° C., to give an absolutely dry product and is silylated with silylating agents such as alkyl- or aryl- or mixed alkyl-aryl-halosilanes. In this process the silica is treated in the absence of oxygen with small quantities of steam, with an inert gas and with a gaseous silylating agent at a temperature from 200° C. to 800° C., preferably at from 400° C. to 600° C. A disadvantage of this process is the low yield of silica-bonded silylating agent. A further disadvantage of this process is the residual content of surface silanol groups of the silica.

DE-A 19 16 360 (Deutsche Gold- und Silber-Scheideanstalt) describes a process in which silica is dried in a fluidized bed with a dry stream of inert gas at temperatures of from 600° C. to 1000° C., preferably from 800° C. to 900° C., to give an absolutely dry product which is loaded at temperatures of from 25° C. to 350° C. with linear and/or cyclic organopolysiloxanes and, if desired, organohalosilanes, which have been converted into the gas phase, and is reacted at temperatures in the range from 350° C. to 650° C. with organosilicon compounds, before being treated at temperatures of from 125° C. to 500° C. The silylating agents used are linear or cyclic organopolysiloxanes which can be vaporized in the temperature range mentioned or are formed as vapor in this temperature range, or mixtures.

The processes described above operate with gaseous silylating agents. The actual chemical reaction of silylation is therefore subsequent to the equilibrium of adsorption/desorption between gaseous and surface-bound silylating agent. At the elevated temperatures which are necessary for the chemical fixation of the silylating agent, this equilibrium lies heavily on the side of desorption of the silylating agent from the silica surface. Consequently the yields which can be obtained, based on silylating agent employed to silylating agent bonded to silica, are low. The low yield leads to increased environmental pollution owing to unreacted silylating agent, and to high costs.

DE-A 25 13 608 (Deutsche Gold- und Silber-Scheideanstalt) discloses a process in which silica is dried in a fluidized bed with a dry stream of inert gas at temperatures of from 600° C. to 1000° C., preferably from 800° C. to 900° C., to give an absolutely dry product which is subsequently brought into a fluidized state while heating at temperatures in the range from about 200° C. to 300° C., during which it is admixed dropwise with a volatile organosilane which is stable and boils at below 300° C. Laboratory experiments indicate, however, that the dropwise addition of organosilane to silica at temperatures above the boiling point of the silane gives a poor yield and, does not lead to the high degrees of silylation desired.

DE-A 24 03 783 (Bayer AG) describes a process for the silylation of silica, in which silica is sprayed over the fluidized silica with a mixture of a liquid organosilane which reacts slowly with water, and large quantities of water, which are about 50% above those of the silazane used, at temperatures of from 0° C. to 100° C., preferably room temperature, and the resulting product is freed from the volatile constituents at temperatures of from 130° C. to 170° C. As described therein, the thickening effect of the resulting silica is severely reduced by the treatment.

In DE 27 28 490 (Deutsche Gold- und Silber-Scheideanstalt), silica is silylated using organopolysiloxanes in appropriate solvents. The silica formed exhibits neither substantial thickening nor structuring of liquids.

In addition, processes are known in which pulverulent inorganic oxides, for example silicas, are sprayed with liquid organosilicon compounds in the form of small, liquid drops. Very finely divided inorganic oxides, such as highly disperse silicas, are characterized by extremely low primary particle diameters, within the submicron range. Spraying with a silylating agent by conventional spraying techniques has been found to lead to inhomogeneous covering and to particles which are only physically coated and which are not completely apolar. Our laboratory experiments show that such processes are unsuitable for the homogeneous covering of highly disperse silicas with the development of a high degree of silylation and the elimination of all reactive silanol groups, and with a coat of silylating agent which is fixed completely chemically, i.e., which is no longer soluble. These problems occur in particular when using silylating agents of high viscosity.

In DE 21 070 82 (Imperial Chemical Industries Ltd.), pyrogenic silica is sprayed with liquid organosilicon compounds. However, only a moderate degree of silylation of the silica is achieved, characterized by a methanol number (defined therein as the percentage by weight of methanol in water which is sufficient to wet the silica completely, to bring about complete sinking of the silica in a water/methanol mixture) of less than 35.

In the process according to DE 20 57 731 (Deutsche Gold- und Silber-Scheideanstalt) it is necessary to add ammonia in order to render silica hydrophobic when it is sprayed with alkoxysilanes and/or alkoxy-terminal organosiloxanes.

DE-A 37 07 226 (Wacker-Chemie GmbH) discloses a process for the preparation of highly disperse metal oxide having a surface modified by ammonium-functional organopolysiloxane, as a charge controlling agent for positive chargeable toners, in which an alcoholic solution of an ammonium-functional organopolysiloxane is added to the silicon dioxide.

A disadvantage of the prior art is that complete silylation of the silica while retaining its thickening effect, does not occur, although large excess quantities of silylating agent are employed, which thereby represent pollution to the environment.

SUMMARY OF INVENTION

The object of the present invention is to improve the known silylation processes and to provide a highly apolar silica having improved properties. This object is achieved by the invention.

The present invention relates to a process for the silylation of very finely divided inorganic oxides, characterized in that the very finely divided inorganic oxides are treated with at least one silylating agent which is relatively nonvolatile in the temperature range of the overall process, with the proviso that the relatively nonvolatile silylating agent is admixed as a liquid with the very finely divided inorganic oxides, in the form of a very finely atomized aerosol.

In the process according to the invention it is possible to use very finely divided inorganic metal oxides, having an average primary particle size of up to 1 μm. Such metal oxides are preferably titanium dioxide, aluminium oxide and silicon dioxides, such as silicas. Silica can be prepared by wet-chemical precipitation or, pyrogenically, by the flame hydrolysis of, for example, tetrachlorosilane.

The silicas which are preferably used in the process according to the invention have an average primary particle size of up to 250 nm, preferably less than 100 nm, and more preferably an average primary particle size of from 2 to 50 nm, in particular with a specific surface area of greater than 25 m²/g, preferably from 50 m²/g to 400 m²/g and more preferably from 150 m²/g to 250 m²/g (measured by the BET method in accordance with DIN 66131 and 66132). Hydrophilic or already silylated silicas can be employed. Precipitation silicas or pyrogenically prepared silicas can be employed. Particular preference is given to pyrogenically prepared, highly disperse silicas, which are produced pyrogenically from halosilicon compounds in a known manner as described in DE 26 20 737. They are prepared by hydrolysis of silicon tetrachloride in an oxyhydrogen gas flame.

The pyrogenic silica may come directly from the burner, may have been stored or may be already in the familiar commercial packaging.

The inorganic oxide used in the process according to the invention may be an inorganic oxide, for example pyrogenic silica, whose surface has been modified with dialkylsiloxy groups, such as the modified silica prepared in accordance with DE 42 21 716 (Wacker-Chemie GmbH) which already has a carbon content of less than 1% by weight per 100 m²/g of specific surface area (measured by the BET method in accordance with DIN 66131 and 66132). Silica of this kind is more preferred. This silica may be freshly prepared. However, this silica may also be employed as stored or as commercially packaged silica.

The silylating agent used is an organosilicon compound or a mixture of two or more organosilicon compounds, at least one of the organosilicon compounds employed being relatively nonvolatile in the process temperature range of from 0° C. to 350° C., preferably from 20° C. to 250° C. and more preferably from 20° C. to 180° C. If in a preferred embodiment volatile organosilicon compounds are used, then those used have a boiling point below the above mentioned process temperature range. In this context the term process refers to the entire procedure of silylation, starting with the mixing of silica and silylating agent and comprising all of the subsequent after treatment and purification steps.

The organosilicon compounds employed are preferably organosilanes of the formula

$$R^1_n SiX_{4-n} \qquad (I)$$

in which $R^1$ is identical or different and is a monovalent, optionally halogenated, hydrocarbon radical having 1 to 18 carbon atoms, X is identical or different and is a halogen, preferably chlorine, or OH, $OR^2$, $OCOR^2$, $O(CH_2)_x OR^2$, $R^2$ is identical or different and is a monovalent hydrocarbon radical having 1 to 8 carbon atoms, n is 1 or 2, preferably 2, and x is 1, 2, or 3, preferably 1, and/or organosiloxanes of the formula

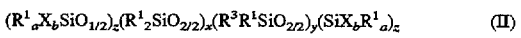
$$(R^1_a X_b SiO_{1/2})_z (R^1_2 SiO_{2/2})_x (R^3 R^1 SiO_{2/2})_y (SiX_b R^1_a)_z \qquad (II)$$

in which $R^1$ is as defined above.

$R^2$ is as defined above, $R^3$ is identical or different, is a hydrogen or a monovalent, optionally halogenated, hydrocarbon radical having 1 to 18 carbon atoms which is different from $R^1$, X is as defined above, preferably OH a is 0, 1, 2 or 3, preferably 2, b is 0, 1, 2 or 3, preferably 1, the sum of a+b being equal to 3.

x is 0 or an integer from 1 to 200, preferably from 10 to 50, y is 0 or an integer from 1 to 200, with x to y preferably being at least equal to 5 to 1 and the sum x+y being equal to 0 or an integer between 1 and 200, preferably from 10 to 50, z is 0 or 1 with the proviso that z is greater than 0 of the sum of x+y is 0, and z is preferably 1.

The preparation of the organosilanes and organosiloxanes are widely known and is carried out on the basis of known preparation methods.

Examples of $R^1$ are alkyl radicals such as the methyl radical, the ethyl radical, propyl radicals such as the isopropyl or n-propyl radical, butyl radicals such as the tert-butyl or n-butyl radical, pentyl radicals such as the neopentyl, isopentyl or n-pentyl radical, hexyl radicals such as the n-hexyl radical, heptyl radicals such as the n-heptyl radical, octyl radicals such as the 2-ethyl-hexyl or n-octyl radical, decyl radicals such as the n-decyl radical, dodecyl radicals such as the n-dodecyl radical, hexadecyl radicals such as the n-hexadecyl radical, octadecyl radicals such as the n-octadecyl radical, alkenyl radicals such as the vinyl, 2-allyl or 5-hexenyl radical, aryl radicals such as the phenyl, biphenyl or naphthyl radical, alkylaryl radicals such as benzyl, ethylphenyl, tolyl or xylyl radicals, halogenated alkyl radicals such as the 3-chloropropyl, 3,3,3-trifluoropropyl or perfluorohexylethyl radical, or halogenated aryl radical such as the chlorophenyl or chlorobenzyl radical. Preferred examples of $R^1$ are the methyl radical, the ethyl radical, propyl radicals such as the isopropyl or n-propyl radical, and butyl radicals such as the tert-butyl or n-butyl radical. Particular preference is given to the methyl radical.

Examples of $R^2$ are alkyl radicals such as the methyl radical, the ethyl radical, propyl radicals such as the isopropyl or n-propyl radical, butyl radicals such as the tert-butyl or n-butyl radical, pentyl radicals such as the neopentyl, isopentyl or n-pentyl radical, hexyl radicals such as the n-hexyl radical, heptyl radicals such as the n-heptyl radical, octyl radicals such as the 2-ethyl-hexyl or n-octyl radical. Preferred examples of $R^2$ are the methyl, ethyl and propyl radical. More preference is given to the methyl radical.

Examples of $R^3$ are alkyl radicals such as the methyl radical, the ethyl radical, propyl radicals such as the isopropyl or n-propyl radical, butyl radicals such as the tert-butyl or n-butyl radical, pentyl radicals such as the neopentyl, isopentyl or n-pentyl radical, hexyl radicals such as the n-hexyl radical, heptyl radicals such as the n-heptyl radical, octyl radicals such as the 2-ethyl-hexyl or n-octyl radical, decyl radicals such as the n-decyl radical, dodecyl radicals such as the n-dodecyl radical, hexadecyl radicals such as the n-hexadecyl radical, octadecyl radicals such as the n-octadecyl radical, alkenyl radicals such as the vinyl, 2-allyl or 5-hexenyl radical, aryl radicals such as the phenyl, biphenyl or naphthyl radical, alkylaryl radicals such as benzyl, ethylphenyl, tolyl or xylyl radicals, halogenated alkyl radicals such as the 3-chloropropyl, 3,3,3-trifluoropropyl or perfluorohexylethyl radical, or halogenated aryl radical such as the chlorophenyl or chlorobenzyl radical. The n-octyl, n-octadecyl, the vinyl and the 3,3,3-trifluoropropyl radicals are preferred. More preference is given to the n-octyl radical.

Examples of organosilanes in accordance with formula (I) are methyltrichlorosilane, vinyltrichlorosilane, dimethyldichlorosilane, vinylmethyldichlorosilane, methyltrimethoxysilane, vinyltrimethoxysilane, dimethyldimethoxysilane, vinylmethyldimethoxysilane, methyltriethoxysilane, vinyltriethoxysilane, dimethyldiethoxysilane, vinylmethylethoxysilane, methyltriacethoxysilane, dimethyldiacethoxysilane, octylmethyldichlorosilanes and octadecylmethyldichlorosilane. Preference is given to the dialkylsilanes, and particular preference to dialkyldichlorosilanes such as dimethyldichlorosilane, octylmethyldichlorosilane and octadecylmethyldichlorosilane, and to dimethyldimethoxysilane and dimethyldiethoxysilane. Dimethyldichlorosilane is more preferred.

It is also possible to employ any desired mixtures of organosilanes in any proportions. Preferred mixtures are those in which, in accordance with formula (I), compounds where n=2 are present to the extent of more than 80 mole %, preferably greater than 90 mole %. More preference is given to mixtures in which at least one compound of formula (I) in which $R^1$ is different, for example a methyl group and an alkyl group having at least 6 carbon atoms. Preferred mixtures in this case comprise dimethyldichlorosilane and octylmethyldichlorosilane in a ratio of from 5:1 to 50:1.

Examples of organosiloxanes are linear or cyclic dialkylpolysiloxanes having an average number of dialkylsiloxy units of up to 200, preferably from 5 to 100 and more preferably from 10 to 50. Preference is given to the dialkylpolysiloxanes, among which the dimethylpolysiloxanes are preferred. More preference is given to linear polydimethylsiloxanes having the following end groups: trimethylsiloxy, dimethylhydroxysiloxy, dimethylchlorosiloxy, dimethylmethoxysiloxy, dimethylethoxysiloxy, methyldichlorosiloxy, methyldimethoxysiloxy, methyldiethoxysiloxy, dimethylacetoxysiloxy and methyldiacetoxysiloxy; the end groups are identical or different. Among the polydimethysiloxanes mentioned, more preference is given to those having a viscosity of from 10 to 100 mPa.s, in particular from 20 to 60 mPa.s at 25° C., in which both end groups are dimethylhydroxysiloxy groups. Any desired mixtures and proportions of the above mentioned organosiloxanes can also be employed.

More preference is given to silylating agents or mixtures of silylating agents, according to formulae (I) and (II), which lead, on the highly apolar pyrogenic silica, to a covering with hydrocarbon-siloxy groups of which at least 80 mole %, preferably at least 90 mole % and more preferably at least 98 mole % are siloxy groups substituted with two hydrocarbon radicals, preferably dialkylsiloxy groups and more preferably dimethylsiloxy groups.

In a preferred embodiment, the organosilicon compounds employed as silylating agents in the process according to formulae (I) and (II) may represent a single type of an organosilane and organopolysiloxane of formula (I) or formula (II), or a mixture of at least two different types of the organosilane and organosiloxane of formula (I) or formula (II), or one type of the organosilane of formula (I) and a mixture of the organosiloxane of formula (II) or a mixture of the organosilane of formula (I) and one type of the organosiloxane of formula (II).

All parts by weight indicated relate to 100 parts by weight of silica.

The silylating agent is preferably added in quantities of from 2 to 100 parts by weight, preferably from 5 to 50 parts by weight.

In a preferred embodiment of the process according to the invention, the silylating agents employed are relatively nonvolatile and volatile organosilicon compounds, the term relatively nonvolatile referring to the fact that the silylating agent does not desorb into the gas phase within the process temperature range; this is preferably the case at a vapor pressure of from 0 mbar to 100 mbar and more preferably at a vapor pressure of from 0 mbar to 10 mbar. The silylating agent may be employed in any desired proportions of relatively nonvolatile organosilicon compounds, and preferably comprises from 1% to 99% by weight, particularly preferably from 20% to 95% by weight and more preferably from 50% to 90% by weight of nonvolatile organosilicon compounds.

In a preferred embodiment of the process according to the invention, protic solvents are employed in addition to the organosilicon compounds. These solvents may be employed in liquid, atomized or gaseous form. They preferably comprise water and/or lower alcohols. Mixtures of different alcohols and mixtures of one or more alcohols with water may be employed. The additional treatment with water, alcohol and additional volatile organosilicon compound may be carried out in any desired sequence. The additional treatment with water, alcohol and additional volatile organosilicon compound may be carried out prior to, in the same step as, or subsequent to the treatment with relatively nonvolatile organosilicon compounds.

The protic solvents employed in the process according to the invention may preferably be lower alcohols or mixtures of different lower alcohols. Alcohols having not more than 8 carbon atoms are preferred. More preference is given to alkanols such as methanol, ethanol, isopropanol, butanol and hexanol.

The alcohols or alcohol mixtures are preferably employed in quantities of from 0.5 to 50 parts by weight, preferably in quantities of from 1 to 20 parts by weight and more preferably in quantities of from 2 to 10 parts by weight.

As protic solvent in the process according to the invention, water may be employed as a homogeneous mixture with a lower alcohol or with mixtures of different lower alcohols. The water is preferably employed in quantities of from 0.5 to 50 parts by weight and most preferably in quantities of from 2 to 20 parts by weight. If water is employed in a mixture with alcohols, the ratio of water to alcohol employed is preferably from 1:10 to 10:1, preferably from 1:4 to 4:1. More preference is given to a quantity by weight of water which does not exceed the quantity by weight of silylating agent.

In the process according to the invention, the silica which is not specially dried, may be water-moist and contains HCl gas, is set in motion in such a way that it is fluidized by means of transporting devices such as fans or compressed-air diaphragm pumps, or by means of stirring, which can be carried out, for example, by paddle-stirring at from 10 to 5000 rpm, preferably from 100 to 2000 rpm, or fluidized in a fluidized bed by a stream of gas or by a method described in DE 42 21 716 (Wacker-Chemie GmbH) in a silo and mixed intensively at a temperature of from 0° C. to 350° C., preferably from 20° C. to 250° C. and more preferably from 20° C. to 180° C. with the organosilicon compound which at this temperature is relatively nonvolatile, liquid and in the form of a very finely atomized aerosol, this organosilicon compound being very finely distributed throughout the reaction space. The term very finely atomized organosilicon compound relates to an average droplet size of less than 500 µm, preferably less than 250 µm and more preferably less than 100 µm. The term aerosol refers to a disperse system in the form of an aerosol mist which comprises liquid/gaseous phases. The liquid phase is the silylating agent and the gaseous phase is the surrounding gas, such as inert gas comprising nitrogen and/or carbon dioxide, air, or inert gas mixtures with air. Very free atomization is brought about by by means of nozzle, disc or ultrasonic atomization techniques. An ultrasonic nebulizer from Lechler or discs from Niro Atomizer may be used for this purpose. Mixtures of different organosilicon compounds may be employed. This mixing operation is carried out for a residence time of from 1 second to 24 hours preferably from 5 seconds to 60 minutes. Mixing is carried out at from 100 mbar to 3 bar, preferably at atmospheric pressure.

Subsequently, following this mixing operation, the reaction is brought to completion outside the reaction vessel in a second vessel, which may if desired be closed, or preferably within the same reaction vessel by means of an after treatment, a heat treatment at a temperature of from 0° C. to 400° C., preferably at from 50° C. to 350° C. and more preferably at from 60° C. to 180° C. for a period of from 1 min to 48 hours, preferably from 15 min to 6 hours. The after treatment may be carried out on the silica which is at rest, which has been set in motion by stirring or which is fluidized by means of a stream of gas, preferably a stream of inert gas, in a fluidized bed. The after treatment may be carried out in one or more reaction vessels.

In addition, there follows a further step of purification of the silica to remove secondary products of the reaction, which is carried out at from 50° C. to 400° C., preferably from 150° C. to 380° C. and more preferably from 250° C. to 360° C. over a period of from 1 min to 6 hours at a pressure of from, 0.01 mbar to atmospheric pressure, preferably at atmospheric pressure. The purification can be carried out on the silica which is at rest, which has been set in motion by stirring or which is fluidized by means of a stream of gas, preferably a stream of inert gas.

The mixing of the silica with the organosilicon compound, the after treatment and the purification of the silica are carried out under inert gas, preference being given to nitrogen and carbon dioxide, or inert gas mixtures with air, so that the ignition capability of the silylating agent is removed.

The steps of the process, such as mixing, after treatment and purification, can be carried out in the form of a batchwise or continuous process.

In all of the process steps, unbonded silylating agent is present in condensed, nongaseous form.

The advantages of the process according to the invention are the preparation of a highly apolar, highly disperse silica, a complete chemical fixation of the silylating agent, process temperatures below 400° C., resulting in a lower energy consumption, a relatively small proportion of volatilizable silylating agent, high reaction yields and therefore a decreased pollution of the waste gas with silylating agent, which is more economic and less harmful to the environment.

A homogeneous reaction of the relatively nonvolatile organosilicon compound takes place on the surface of the silica. Despite the addition of the relatively nonvolatile organosilicon compound for the surface treatment of the silica, a better, higher reaction yield, a higher degree of apolarity and a better rheological effect of the silica is obtained than by using the correspondingly (measured on the basis of carbon content) equal quantity of organosilicon compound which is added only in gas form but is otherwise chemically identical. In addition, despite the use of a relatively nonvolatile organosilicon compound, no fractions of organosilicon compound which are not chemically bonded, and therefore soluble, can be found on the finished silica.

The highly apolar, finely divided inorganic oxide which is prepared by this process is preferably highly apolar silica, more preferably highly apolar, pyrogenic silica having an average primary particle size of less than 100 nm, preferably having an average primary particle size of from 2 to 50 nm and more preferably having an average primary particle size of from 5 to 20 nm, in particular with a specific surface area of greater than 25 $m^2/g$, preferably from 50 to 300 $m^2/g$ and more preferably from 100 to 200 $m^2/g$ (measured by the BET method in accordance with DIN 66131 and 66132). The highly apolar silica according to the invention has, per 100 $m^2/g$ specific surface area (measured by the BET method in accordance with DIN 66131 and 66132), a carbon content of at least 1% by weight, preferably at least 1.5% by weight and more preferably at least 2.0% by weight. No isolated silanol groups can be detected at a wave number of 3750 $cm^{-1}$ on the silica by means of IR spectroscopy. Even after prolonged intense contact with water, for example shaking, the silica has no water-wettable fractions. The silica exhibits a methanol number (Appendix III) of greater than or equal to 50, preferably greater than 65 and more preferably greater than 75. The silylating agent on the silica is firmly fixed chemically and completely and has no component which can be extracted from the silica or is soluble (Appendix I). The highly apolar silica according to the invention displays a low residual content of relative sorption capacity for hydroxyl ions (Appendix II). This residual content is less than 25%, preferably less than 15%, of the initial value of sorption capacity for hydroxyl ions as found for untreated hydrophilic silica. In accordance with these characteristics, the silica according to the invention can be designated as completely apolar or highly apolar. The silica according to the invention is characterized in that it has a high thickening effect, especially in polar systems such as aqueous solutions, for example in mixtures of water with lower alcohols such as methanol, ethanol, isopropanol and n-propanol, especially those having a water content of more than 50% by weight, in aqueous dispersions and emulsions, but also in other polar systems such as polyesters, vinyl esters, epoxides and polyurethanes. In a more preferred embodiment the highly apolar silica silylated with dialkyl-siloxy units is characterized in that it has a higher thickening effect than those silicas which are modified with trialkylsiloxy units and which have the same sorption capacity for hydroxyl ions.

Preference is given to a highly apolar pyrogenic silica in which at least 80 mole % of the bonded silylating agent comprises siloxy groups substituted with two hydrocarbon radicals.

The hydrocarbon radicals are preferably the radicals $R^1$ and $R^3$ as defined above.

The highly apolar silica according to the invention, when used as a rheological additive, shows no defects of adhesion or intercoat adhesion, and also no defects in overcoatability (e.g., cratering), which may occur because of the migration of nonbonded silylating agent constituents.

Silicas are preferably employed as a rheological additive in apolar systems. In apolar systems the establishment of the viscosity by silica takes place in particular by means of hydrogen bonds between the surface silanol groups of the silica particles. In polar systems the surface silanol groups of the silica may lead to a collapse in the viscosity. It is therefore known that hydrophilic silicas do not give a satisfactory action as rheological additive in polar systems such as aqueous alcohols, or in epoxy resins, vinyl ester resins or polyurethanes. Especially after a prolonged storage period, there is a reduction in the viscosity accompanied by a sharp decrease in the flow limit. This leads to low stability at relatively high coat thicknesses on vertical surfaces and consequently to unwanted running on curing. Conventional silylated silicas likewise achieve no satisfactory rheological effectiveness here after prolonged storage.

The invention also relates to the use of highly apolar, pyrogenic silica prepared by the process according to the invention as thickener in polar systems, as an absorbent for oils, for improving the flowability of toners and in antifoam compositions.

The highly apolar, pyrogenic silica prepared by the process according to the invention exhibits a pronounced increase in viscosity, especially for polar liquid or pasty media which are composed of those chemical compounds which are able to form hydrogen bonds or undergo dipolar interactions, examples being epoxy resins, polyurethanes or polyvinyl ester resins, and leads to the development of a flow limit and to thixotropy in such systems.

The highly apolar silica according to the invention is therefore employed as a rheological additive, for example, in polar polymer, resin and solvent systems such as epoxy resins, polyurethanes, vinyl ester resins and other comparable systems in order to achieve a level of viscosity which is high and is stable over time on storage, structural viscosity and a flow limit.

The invention relates in general to all solvent-free, solvent-containing, water-dilutable, film-forming coating compositions, rubbery to hard coatings, adhesives, sealing and casting compositions and to other comparable systems. It relates to systems of low to high polarity which contain silica as viscosity-imparting component.

The invention relates in particular to systems such as:
Epoxy systems

The epoxy systems are solvent-containing or solvent-free, water-dilutable reactive systems, such as epoxide/phenol, epoxide/amine, epoxide isocyanate baking systems, epoxide/ester and amine curing agents for epoxy resins, such as aliphatic, cycloaliphatic or heterocycloaliphatic polyamines.
Polyurethane systems (PUR)

The polyurethane systems are PUR 1-component systems based on oil-modified urethanes, which cure by oxidation, as cold curing, by way of an unsaturated oil component, PUR 1-component systems which are moisture-curing, and cold curing occurs by atmospheric moisture by way of isocyanate groups, PUR 1-component systems based on blocked polyisocyanates, which cure, as cold curing, by deblocking of the isocyanate groups with aliphatic hydroxyl groups, PUR 1-component systems which dry physically by evaporation at room temperature, PUR 1-component systems on an aqueous basis (PUR ionomers), which cure physically by the water being removed on drying, or PUR 2-component systems comprising isocyanate prepolymers and polyhydroxy compounds.
Vinyl ester resins In contrast to the conventional, unsaturated polyester resins, the use of hydrophilic or conventional silylated silica as a rheological additive in vinyl ester resins presents numerous difficulties.

The highly apolar silica according to the invention, as rheological additive in these systems, provides the desired and required viscosity, structural viscosity, thixotropy and an adequate flow limit for stability on vertical surfaces. This continues to be the case even when the systems are stored for a prolonged period. The silica according to the invention is superior to silica which is hydrophilic and not silylated in accordance with the invention.

In this context, the silica according to the invention provides these properties as a rheological additive without leading to defects in adhesion or intercoat adhesion. Defects in overcoatability (e.g. cratering), which may occur because of the migration of nonbonded constituents of the silylating agent, are not observed with the silica according to the invention.

In addition, the silica according to the invention can be used as an absorbent for mineral oils, silicone oils and bio oils. The silica according to the invention is suitable for improving the flowability of toners. Furthermore, it is suitable as silica in antifoam compositions, preferably for aqueous systems such as detergents.

EXAMPLE 1

4.5 g of water in liquid, very finely atomized form, 16.0 g of methanol in liquid, very finely atomized form and 32.0 g of dimethyldichlorosilane (commercially available under the name WACKER Silan M2 from Wacker-Chemie GmbH, Munich, D) in liquid, very finely atomized form are mixed at a temperature of 30° C. over 15 minutes into 100 g of a pyrogenic silica which is fluidized by stirring at 1000 rpm (paddle stirrer, 6 liter vessel) and has a specific surface area of 200 m$^2$/g (measured by the BET method in accordance with DIN 66131 and 66132), a thickening effect in UP resin[8] of 6000 mPa.s and a thickening effect in 25% ethanol[9] of 10 mPa.s, and which can be prepared in accordance with DE 26 20 737 (commercially available under the name WACKER HDK N20 from Wacker-Chemie GmbH, Munich, D). The very fine atomization is brought about by means of a solid-cone nozzle with a 0.1 mm bore and by a pressure of 10 bar. The silica loaded in this way is first heat-treated at 60° C. for 180 min in a drying oven, and then purified in a fluidized bed in a stream of nitrogen of 2.5 cm/s at 60° C. for 180 min. The quantity of silylating agent employed corresponds, at 100% by weight reaction yield, to a carbon content in the silica of % by weight $C_{theoretical}$=5% by weight (% by weight $C_{theoretical}$/100=quantity of dimethyldichlorosilane (g) * 0.186 divided by 100+quantity of dimethyldichlorosilane (g) * 0.574). The elemental analysis of the silica for carbon is measured by incinerating the silica in oxygen at 1000° C., and the carbon dioxide formed is determined by infrared spectroscopy (Leco CS 244 instrument). The elemental analysis shows, based on the silica-bonded silylating agent, a reaction yield of 60%.

Analytical data of the silica

| | |
|---|---|
| Appearance | loose white powder |
| Surface area by BET[1] | 160 m$^2$/g |
| Tamping density[2] | 55 g/l |
| Loss on drying[3] (2 h at 230° C.) | <0.1% by weight |
| Carbon content | 3.0% by weight |
| pH[4] (in 4% dispersion) | 4.5 |
| IR band (DRIFT) at 3750 cm$^{-1}$ | not detectable |
| Extractable silylating agent[5] | not detectable |
| Rel. sorption capacity[6] for OH$^-$ | 22% |
| Methanol number[7] | 55 |
| Thickening effect in UP resin[8] | 5500 mPa.s |
| Thickening effect in 25% ethanol[9] | 800 mPa.s |

[1] in accordance with DIN 66131 and 66132
[2] in accordance with DIN ISO 787/XI, JIS K 5101/18
[3] in accordance with DIN ISO 787/II, ASTM D 280, JIS K 5101/21
[4] in accordance with DIN ISO 787/IX, ASTM D 1208, JIS K 5101/24
[5] see Appendix I
[6] see Appendix II
[7] see Appendix III
[8] see Appendix IV
[9] see Appendix V

EXAMPLE 2

(not according to the invention)

4.5 g of water and 16.0 g of methanol in liquid, finely atomized form and 32.00 g of dimethyldichlorosilane (commercially available under the name WACKER Silan M2 from Wacker-Chemie GmbH, Munich, D) in gaseous form are mixed at a temperature of 100° C. over 15 minutes into 100 g of a pyrogenic silica which is fluidized by stirring at 1000 rpm (paddle stirrer, 6 liter vessel) and has a specific surface area of 200 m$^2$/g (measured by the BET method in accordance with DIN 66131 and 66132), a thickening effect in UP resins[8] of 6000 mPa.s and a thickening effect in 25% ethanol[9] of 10 mPa.2, and which can be prepared according to DE 26 20 737 (commercially available under the name WACKER HDK N20 from Wacker-Chemie GmbH, Munich, D). The silica loaded in this way is first of all heat-treated at 100° C. in a drying oven for 180 min, and then is purified in a fluidized bed in a stream of nitrogen of 2.5 cm/s at 100° C. for 180 min. The quantity of silylating agent employed corresponds, at a theoretical reaction yield of 100% by weight, to a carbon content in the silica of % by weight $C_{theoretical}$=5% by weight (% by weight $C_{theoretical}$/100=quantity of dimethyldichlorosilane (g) * 0.186 divided by 100+quantity of dimethyldichlorosilane (g) * 0.574). The elemental analysis of the silica for carbon shows a reaction yield, based on the silica-bonded silylating agent, of 30%.

Analytical data of the silica

| | |
|---|---|
| Appearance | loose white powder |
| Surface area by BET[1] | 180 m$^2$/g |
| Tamping density[2] | 50 g/l |
| Loss on drying[3] (2 h at 230° C.) | 0.5% by weight |
| Carbon content | 1.5% by weight |
| pH[4] (in 4% dispersion) | 4.2 |
| IR band (DRIFT) at 3750 cm$^{-1}$ | present |
| Extractable silylating agent residues[5] | detectable |
| Rel. sorption capacity[6] for OH$^-$ | 45% |
| Methanol number[7] | 40 |
| Thickening effect in UP resin[8] | 3500 mPa.s |
| Thickening effect in 25% ethanol[9] | 300 mPa.s |

[1] in accordance with DIN 66131 and 66132
[2] in accordance with DIN ISO 787/XI, JIS K 5101/18
[3] in accordance with DIN ISO 787/II, ASTM D 280, JIS K 5101/21
[4] in accordance with DIN ISO 787/IX, ASTM D 1208, JIS K 5101/24
[5] see Appendix I
[6] see Appendix II
[7] see Appendix III
[8] see Appendix IV
[9] see Appendix V

EXAMPLE 3

15.5 g of a dimethylorganosiloxane which contains no reactive end groups and is in relatively nonvolatile, very finely atomized form are mixed at a temperature of 180° C. over 15 minutes into 100 g of a pyrogenic silica which is fluidized by stirring at 1000 rpm (paddle stirrer, 6 liter vessel) and has a specific surface area of 200 m$^2$/g (measured by the BET method in accordance with DIN 66131 and 66132), a thickening effect in UP resins[8] of 6000 mPa.s and a thickening effect in 25% ethanol[9] of 10 mPa.s, and which can be prepared according to DE 26 20 737 (commercially available under the name WACKER HDK N20 from Wacker-Chemie OmbH, Munich, D). The dimethylorganosiloxane employed is a polydimethylsiloxane end-blocked with trimethylsiloxy groups and having a viscosity at 25° C. of 10 mPa.s (commercially available under the name WACKER Siliconöl [silicone oil] AK 10 from Wacker-Chemie GmbH, Munich, D). The very free atomization is brought about in this case by means of a solid-cone nozzle with a 0.1 mm bore and by a pressure of 15 bar. The AK 10 silicone oil employed shows a volatility at this temperature of less than 0.5% by weight. The silica loaded in this way is stirred at 180° C. for a further 15 minutes and then is purified with gentle nitrogen flushing at 300° C. for 120 min in a drying oven. The quantity of silylating agent employed corresponds, at a reaction yield of 100% by weight, to a carbon content in the silica of % by weight $C_{theoretical}$=5% by weight (% by weight $C_{theoretical}$/100= quantity of dimethylorganosiloxane (g) * 0.324 divided by 100+quantity of dimethylorganosiloxane (g). The elemental analysis of the silica for carbon shows a reaction yield, based on the silica-bonded silylating agent, of 64%.

Analytical data of the silica

| | |
|---|---|
| Appearance | loose white powder |
| Surface area by BET[1] | 170 m$^2$/g |
| Tamping density[2] | 55 g/l |
| Loss on drying[3] (2 h at 230° C.) | <0.1% by weight |
| Carbon content | 3.2% by weight |

-continued

| | |
|---|---|
| pH[4] (in 4% dispersion) | 4.3 |
| IR band (DRIFT) at 3750 cm$^{-1}$ | not detectable |
| Extractable silylating agent residues[5] | not detectable |
| Rel. sorption capacity[6] for OH$^-$ | 24% |
| Methanol number[7] | 55 |
| Thickening effect in UP resin[8] | 4600 mPa.s |
| Thickening effect in 25% ethanol[9] | 800 mPa.s |

[1] in accordance with DIN 66131 and 66132
[2] in accordance with DIN ISO 787/XI, JIS K 5101/18
[3] in accordance with DIN ISO 787/II, ASTM D 280, JIS K 5101/21
[4] in accordance with DIN ISO 787/IX, ASTM D 1208, JIS K 5101/24
[5] see Appendix I
[6] see Appendix II
[7] see Appendix III
[8] see Appendix IV
[9] see Appendix V

EXAMPLE 4

(not according to the invention)

15.5 g of a dimethylorganosiloxane which contains no reactive end groups and is in volatile form are mixed at a temperature of 180° C. over 15 minutes into 100 g of a pyrogenic silica which is fluidized by stirring at 1000 rpm (paddle stirrer, 6 liter vessel) and has a specific surface area of 200 m$^2$/g (measured by the BET method in accordance with DIN 66131 and 66132), a thickening effect in UP resin[8] of 6500 mPa.s and a thickening effect in 25% ethanol[9] of 10 mPa.s, and which can be prepared according to DE 26 20 737 (commercially available under the name WACKER HDK N20 from Wacker-Chemie GmbH, Munich, D). The dimethylorganosiloxane employed is octamethylcyclotetrasiloxane. The silica loaded in this way is stirred at 180° C. for an additional 15 minutes and then purified with gentle nitrogen flushing at 300° C. for 120 min in a drying oven. The quantity of silylating agent employed corresponds, at a reaction yield of 100% by weight, to a carbon content in the silica of % by weight $C_{theoretical}$=5% by weight (% by weight $C_{theoretical}$/100=quantity of dimethylorganosiloxane (g) * 0.324 divided by 100+quantity of dimethylorganosiloxane (g)). The elemental analysis of the silica for carbon shows a reaction yield, based on the silica-bonded silylating agent, of 34% by weight.

Analytical data of the silica

| | |
|---|---|
| Appearance | loose white powder |
| Surface area by BET[1] | 185 m$^2$/g |
| Tamping density[2] | 48 g/l |
| Loss on drying[3] (2 h at 230° C.) | <0.1% by weight |
| Carbon content | 1.7% by weight |
| pH[4] (in 4% dispersion) | 4.3 |
| IR band (DRIFT) at 3750 cm$^{-1}$ | present |
| Extractable silylating agent residues[5] | detectable |
| Rel. sorption capacity[6] for OH$^-$ | 62% |
| Methanol number[7] | 35 |
| Thickening effect in UP resin[8] | 3500 mPa.s |
| Thickening effect in 25% ethanol[9] | 200 mPa.s |

[1] in accordance with DIN 66131 and 66132
[2] in accordance with DIN ISO 787/XI, JIS K 5101/18
[3] in accordance with DIN ISO 787/II, ASTM D 280, JIS K 5101/21
[4] in accordance with DIN ISO 787/IX, ASTM D 1208, JIS K 5101/24
[5] see Appendix I
[6] see Appendix II
[7] see Appendix III
[8] see Appendix IV
[9] see Appendix V

EXAMPLE 5

75 g/h of OH-terminal polydimethylsiloxane having a viscosity of 40 mPa.s at 25° C. (commercially available under the name WACKER Weichmacher [plasticizer] X 345 from Wacker-Chemie GmbH, D) in a mixture of 1 to 1000 parts by volume with nitrogen at a pressure of 10 bar is added at a temperature of 100° C. in liquid, very finely atomized form with a solid-cone nozzle with 0.1 mm bore to a mass flow of 1000 g/h of a pyrogenic silica which is fluidized by nitrogen at an empty-pipe gas rate of 0.1 cm/s and having a specific surface area of 200 m$^2$/g (measured by the BET method in accordance with DIN 66131 and 66132), a thickening effect in UP resin[8] of 6500 mPa.s and a thickening effect in 25% ethanol[9] of 10 mPa.s, and which can be prepared according to DE 26 20 737 (commercially available under the same WACKER HDK N20 from Wacker-Chemie GmbH, Munich, D), and 60 g/h of steam, 30 g/h of methanol vapor and 135 g/h of dimethyldichlorosilane (commercially available under the name WACKER Silan M2 from Wacker-Chemie GmbH, Munich, D) are mixed in in gaseous form. The residence time of the silica loaded in this way at 100° C. is 2 hours. The silica is subsequently purified in an adjacent, further reaction vessel at 300° C. for 30 minutes, fluidized by nitrogen at an empty-pipe gas rate of 1.0 cm/s, and in a third reaction vessel at 300° C. for 15 min, by fluidization with an air/nitrogen mixture at an empty-pipe gas rate of 2.5 cm/s. The quantity of silylating agent employed corresponds, at a reaction yield of 100% by weight, to a carbon content in the silica of % by weight $C_{theoretical}$=5% by weight (% by weight $C_{theoretical}$/100=quantity of dimethyldichlorosilane (g) * 0.186+quantity of polydimethylsiloxane (g) * 0.324 divided by 100+quantity of polydimethylsiloxane (g)+quantity of dimethyldichlorosilane (g) * 0.574). The elemental analysis of the silica for carbon shows a reaction yield, based on the silica-bonded silylating agent, of 88% by weight.

Analytical data of the silica

| | |
|---|---|
| Appearance | loose white powder |
| Surface area by BET[1] | 125 m$^2$/g |
| Tamping density[2] | 55 g/l |
| Loss on drying[3] (2 h at 230° C.) | <0.1% by weight |
| Carbon content | 4.4% by weight |
| pH[4] (in 4% dispersion) | 4.4 |
| IR band (DRIFT) at 3750 cm$^{-1}$ | not detectable |
| Extractable silylating agent residues[5] | not detectable |
| Rel. sorption capacity[6] for OH$^-$ | 13% |
| Methanol number[7] | 80 |
| Thickening effect in UP resin[8] | 7800 mPa.s |
| Thickening effect in 25% ethanol[9] | 1800 mPa.s |

[1] in accordance with DIN 66131 and 66132
[2] in accordance with DIN ISO 787/XI, JIS K 5101/18
[3] in accordance with DIN ISO 787/II, ASTM D 280, JIS K 5101/21
[4] in accordance with DIN ISO 787/IX, ASTM D 1208, JIS K 5101/24
[5] see Appendix I
[6] see Appendix II
[7] see Appendix III
[8] see Appendix IV
[9] see Appendix V

EXAMPLE 6 g of OH-terminal reactive polydimethylsiloxane having a viscosity of 40 mPa.s at 25° C. (commercially available under the name WACKER Weichmacher [plasticizer]X 345 from Wacker-Chemie GmbH, D) in the form of liquid droplets which are very finely atomized using a disc atomizer and which have an average radius of less than 100 μm, 10.0 g of water in liquid, very finely atomized form, 10.0 g of methanol in liquid, very finely atomized form, and 10.0 g of dimethyldichlorosilane (commercially available under the name WACKER Silan M2 from Wacker-Chemie GmbH, Munich, D) in liquid, very finely atomized form are mixed at a temperature of 30° C. over 20 minutes by means of a solid-cone nozzle with a 0.1 mm bore and by a pressure of 10 bar into 100 g of a pyrogenic silica which is fluidized by stirring at 1000 rpm (paddle stirrer, 6 liter vessel) and has a specific surface area of 200 m²/g (measured by the BET method in accordance with DIN 66131 and 66132), a thickening effect in UP resins[8] of 6500 mPa.s and a thickening effect in 25% ethanol[9] of 10 mPa.s, and which can be prepared according to DE 26 20 737 (commercially available under the name WACKER HDK N20 from Wacker-Chemie GMbH, Munich, D). The silica loaded in this way is heat-treated at 100° C. for 120 min in a drying oven, and then purified with gentle nitrogen flushing at 300° C. for 120 min in a drying oven. The quantity of silylating agent employed corresponds, at a reaction yield of 100% by weight to a carbon content of the silica of % by weight $C_{theoretical}$=5.1% by weight (% by weight $C_{theoretical}$/100= quantity of dimethyldichlorosilane (g) * 0.186+quantity of polydimethylsiloxane (g) * 0.324 divided by 100+quantity of polydimethylsiloxane (g)+quantity of dimethyldichlorosilane (g) * 0.574. The elemental analysis of the silica for carbon shows a reaction yield, based on the silica-bonded silylating agent, of 95% by weight.

Analytical data of the silica

| Appearance | loose white powder |
|---|---|
| Surface area by BET[1] | 118 m²/g |
| Tamping density[2] | 52 g/l |
| Loss on drying[3] (2 h at 230° C.) | <0.1% by weight |
| Carbon content | 4.8% by weight |
| pH[4] (in 4% dispersion) | 4.6 |
| IR band (DRIFT) at 3750 cm⁻¹ | not detectable |
| Extractable silylating agent residues[5] | not detectable |
| Rel. sorption capacity[6] for OH⁻ | 11% |
| Methanol number[7] | 80 |
| Thickening effect in UP resin[8] | 7600 mPa.s |
| Thickening effect in 25% ethanol[9] | 1900 mPa.s |

[1] in accordance with DIN 66131 and 66132
[2] in accordance with DIN ISO 787/XI, JIS K 5101/18
[3] in accordance with DIN ISO 787/II, ASTM D 280, JIS K 5101/21
[4] in accordance with DIN ISO 787/IX, ASTM D 1208, JIS K 5101/24
[5] see Appendix I
[6] see Appendix II
[7] see Appendix III
[8] see Appendix IV
[9] see Appendix V EXAMPLE 7
(not according to the invention)

10 g of OH-terminal polydimethylsiloxane having viscosity of 40 mPa.s at 25° C. (commercially available under the name WACKER Weichmacher [plasticizer] X 345 from Wacker-Chemie GmbH, D) in the form of liquid droplets having an average droplet diameter of greater than 500 μm are sprayed at a temperature of 30° C. over 20 minutes via a nozzle into 100 g of a pyrogenic silica which is fluidized by stirring at 1000 rpm (paddle stirrer, 6 liter vessel) and has a specific surface area of 200 m²/g (measured by the BET method according to DIN 66131 and 66132), a thickening effect in UP resin[8] of 6500 mPa.s and a thickening effect in 25% ethanol[9] of 10 mPa.s, and which can be prepared according to DE 26 20 737 (commercially available under the name WACKER HDK N20 from Wacker-Chemie GmbH, Munich, D), and 10.0 g of water in liquid, very finely atomized form, 10.0 g of methanol in liquid, very finely atomized form and 10.0 g of methanol in liquid, very finely atomized form and 10.0 g of dimethyldichlorosilane (commercially available under the name WACKER Silan M2 from Wacker-Chemie GmbH, Munich, D) in liquid, very finely atomized form are mixed by means of a solid-cone nozzle with a 0.1 mm bore and by a pressure of 10 bar. The silica loaded in this way is heat-treated at 100° C. for 120 min in a drying oven, and then is purified with gentle nitrogen flushing at 300° C. for 120 min in a drying oven. The quantity of silylating agent employed corresponds, at a reaction yield of 100% by weight, to a carbon content in the silica of % by weight $C_{theoretical}$=5.1% by weight (% by weight $C_{theoretical}$/100=quantity of dimethyldichlorosilane (g) * 0.186+quantity of polydimethylsiloxane (g) * 0.324 divided by 100+quantity of polydimethylsiloxane (g)+ quantity of dimethyldichlorosilane (g) * 0.574). The elemental analysis of the silica for carbon shows a reaction yield, based on the silica-bonded silylating agent, of 35% by weight.

Analytical data of the silica

| Appearance | loose white powder |
|---|---|
| Surface area by BET[1] | 183 m²/g |
| Tamping density[2] | 65 g/l |
| Loss on drying[3] (2 h at 230° C.) | <1.6% by weight |
| Carbon content | 1.7% by weight |
| pH[4] (in 4% dispersion) | 4.6 |
| IR band (DRIFT) at 3750 cm⁻¹ | not detectable |
| Extractable silylating agent residues[5] | not detectable |
| Rel. sorption capacity[6] for OH⁻ | 52% |
| Methanol number[7] | 40 |
| Thickening effect in UP resin[8] | 3600 mPa.s |
| Thickening effect in 25% ethanol[9] | 400 mPa.s |

[1] in accordance with DIN 66131 and 66132
[2] in accordance with DIN ISO 787/XI, JIS K 5101/18
[3] in accordance with DIN ISO 787/II, ASTM D 280, JIS K 5101/21
[4] in accordance with DIN ISO 787/IX, ASTM D 1208, JIS K 5101/24
[5] see Appendix I
[6] see Appendix II
[7] see Appendix III
[8] see Appendix IV
[9] see Appendix V

EXAMPLE 8

10 g of OH-terminal polydimethylsiloxane having a viscosity of 40 mPa.s at 25° C. (commercially available under the name WACKER Weichmacher [plasticizer] X 345 from Wacker-Chemie GmbH, D) in the form of liquid droplets, very finely atomized with a disc atomizer and having an average radius of less than 100 μm, and 10.0 g of water in liquid, very finely atomized form, 10.0 g of methanol in liquid, very finely atomized form and 10.0 g of dimethyldichloro-silane (commercially available under the name WACKER Silan M2 from Wacker-Chemie GmbH, Munich, D) in liquid, very finely atomized form are mixed at a temperature of 30° C. over 20 minutes by means of a solid-cone nozzle with a 0.1 mm bore and by a pressure of 10 bar into 100 g of a pyro-genic silica which is fluidized by stirring at 1000 rpm (paddle stirrer, 6 liter vessel), is surface-modified with dimethylsiloxy groups and has a carbon content of 1.0% by weight, a specific surface area of 160 m²/g (measured by the BET method in accordance with DIN 66131 and 66132), a thickening effect in UP resins[8] of 4000 mPa.s and a thickening effect in 25% ethanol[9] of 200 mPa.s, which can be prepared according to DE 42 21 716 (commercially available under the name WACKER HDK H20 from Wacker-Chemie GmbH, Munich, D). The silica loaded in this way is heat-treated at 100° C. for 120 min in a drying oven, and then purified with gentle nitrogen flushing at 300° C. for 120 min in a drying oven. The quantity of silylating agent employed corresponds, at a reaction yield of 100% by weight, to a carbon content in the silica of % by weight $C_{theoretical}$-1.0% by weight=5.1% by weight (% by weight $C_{theoretical}$/100=quantity of dimethyldichlorosilane (g) * 0.186+quantity of polydimethylsiloxane (g) * 0.324 divided by 100+quantity of dimethyldichlorosilane (g) * 0.574+quantity of polydimethylsiloxane (g). The elemental analysis of the silica for carbon shows a reaction yield, based on the silylating agent which is additionally silica-bonded in the treatment, of 92% by weight.

Analytical data of the silica

| Appearance | loose white powder |
|---|---|
| Surface area by BET[1] | 105 m$^2$/g |
| Tamping density[2] | 42 g/l |
| Loss on drying[3] (2 h at 230° C.) | <1.0% by weight |
| Carbon content | 5.7% by weight |
| pH[4] (in 4% dispersion) | 4.8 |
| IR band (DRIFT) at 3750 cm$^{-1}$ | not detectable |
| Extractable silylating agent residues[5] | not detectable |
| Rel. sorption capacity[6] for OH$^-$ | 8% |
| Methanol number[7] | 85 |
| Thickening effect in UP resin[8] | 10,600 mPa.s |
| Thickening effect in 25% ethanol[9] | 2900 mPa.s |

[1] in accordance with DIN 66131 and 66132
[2] in accordance with DIN ISO 787/XI, JIS K 5101/18
[3] in accordance with DIN ISO 787/II, ASTM D 280, JIS K 5101/21
[4] in accordance with DIN ISO 787/IX, ASTM D 1208, JIS K 5101/24
[5] see Appendix I
[6] see Appendix II
[7] see Appendix III
[8] see Appendix IV
[9] see Appendix V

EXAMPLE 9 to 16

In order to investigate the silica in a solvent-free epoxy-polyamino amide system, 210 g of an epoxy resin (based on bisphenol A and epichlorohydrin) having a viscosity at 25° C. of 9000 mPa.s and an epoxide value in accordance with DIN 53188 of 0.54 (commercially available under the name Europox 730 Schering AG, Bergkamen, D), 2.10 g of a blue phthalocyanine color pigment (commercially available under the name Heliogenblau L 6700T BASF, Stuttgart, D) and 8.4 g of silica prepared according to Examples 1 to 8, are introduced cooling and with the dissolver (commercially available under the name Dispermat F105, Getzmann, Reichshof-Heienbach, D) running, at room temperature over 5 min. (toothed disc with a diameter of 5 cm, speed of rotation 2800 rpm) and subsequently dispersed on a triple roll mill (Exakt 80 S, Exakt-Apperatebau Otto Herrmann, Norderstedt, D) (roll nip at the front: 2 mm, at the back: 3 mm, speed of rotation 80 rpm, 3 passes). For the determination of the "viscosity before storage" and for the determination of the "layer thickness on vertical surfaces before storage" or, for the determination of the "layer thickness on vertical surfaces after storage", after storage for 14 days at 60° C. 50 g of a polyamino amide having a viscosity at 25° C. of 550 mPa.s and an amine number in accordance with DIN 16945 of 440 (commercially available under the name Eurodur 250 (Schering AG, Bergkamen, D) are mixed in at 25° C. over 5 minutes using a mixer having a blade stirrer with a diameter of 70 mm (commercially available under the name IKA RW27 from Janke und Kunkel, D) at 400 rpm. Immediately thereafter, the composition prepared in this way is divided, and one part is used to determine the viscosity while the other part is used to determine the layer thickness on vertical surfaces.

Determination of the viscosity: The viscosity of the composition is measured using a Brookfield viscometer RVT DV-II, spindle 6, at 25° C.

Determination of the layer thickness on vertical surfaces: Using stepped doctor blades, the composition is coated onto a black/white contrast card in layer thicknesses of from 600 to 2600 μm (subdivided into steps of 100 μm each time) and the card is placed in a vertical position.

The parameter recorded is the layer thickness, in micrometers (μm), at which the applied composition begins to flow before it is fully cured.

The viscosities and layer thicknesses on vertical surfaces, measured before and after storage, are compiled in Table 1.

EXAMPLES 17

The procedure of Example 9 is repeated but employing, instead of a silica prepared in accordance with Example 1, a pyrogenic silica which is surface-modified with dimethylsiloxy groups and has a carbon content of 1.0% by weight and a specific surface area of 160 m$^2$/g (measured by the BET method in accordance with DIN 66131 and 66132), and which can be prepared according to DE 42 21 716 (commercially available under the name WACKER HDK H20 from Wacker-Chemie GmbH, Munich, D). The results are given in Table 1.

EXAMPLE 18

The procedure of Example 9 is repeated but employing, instead of a silica prepared in accordance with Example 1, a pyrogenic silica which is surface-modified with trimethylsiloxy groups and has a carbon content of 2.5% by weight and a specific surface area of 140 m$^2$/g (measured by the BET method in accordance with DIN 66131 and 66132), and which can be prepared according to DE 23 44 388 (commercially available under the name WACKER HDK H2000 from Wacker-Chemie GmbH, Munich, D). The results are given in Table 1.

EXAMPLE 19

The procedure of Example 9 is repeated but employing, instead of a silica prepared in accordance with Example 1, a pyrogenic silica which is surface-modified with ammonium-functional organopolysiloxane and has a carbon content of 5.5% by weight and a specific surface area of 110 m$^2$/g (measured by the BET method in accordance with DIN 66131 and 66132), and which can be prepared according to DE-A 37 07 226 (commercially available under the name WACKER HDK H2050 EP from Wacker-Chemie GmbH, Munich, D). The results are given in Table 1.

EXAMPLE 20

The procedure of Example 9 is repeated but employing, instead of a silica prepared in accordance with Example 1, a hydrophilic pyrogenic silica having a specific surface area of 200 m$^2$/g (measured by the BET method in accordance with DIN 66131 and 66132), and which can be prepared according to DE 26 20 737 (commercially available under the name WACKER HDK N20 from Wacker-Chemie GmbH, Munich, D). The results are given in Table 1.

The following Table indicates the viscosity (mPa.s) and layer thickness (μm) on vertical surfaces before and after storage for 14 days at 60° C.

TABLE I

| | (Viscosity (mPa.s)) | | Layer Thickness (μm) | |
|---|---|---|---|---|
| Examples | before storage | after storage | before storage | after storage |
| 9  | 17,000 | 14,600 | 1,700 | 1,200 |
| 10 | 10,300 | 6,900  | 900   | <600  |
| 11 | 16,300 | 13,800 | 1,600 | 1,200 |
| 12 | 9,700  | 6,800  | 1,000 | <600  |
| 13 | 21,200 | 21,100 | 2,200 | 2,100 |
| 14 | 19,900 | 19,300 | 2,100 | 2,100 |
| 15 | 10,200 | 6,200  | 800   | <600  |
| 16 | 23,800 | 23,200 | 2,500 | 2,400 |
| 17 | 9,900  | 7,900  | 800   | <600  |
| 18 | 5,800  | 5,200  | <600  | <600  |
| 19 | 5,100  | 5,100  | <600  | <600  |
| 20 | 18,700 | 5,600  | 2,100 | <600  |

EXAMPLES 21 to 28

In order to investigate the silica in a 2-component polyurethane coating composition, 202.67 g of a solvent-free, branches polyalcohol containing ether and ester groups and having an OH content of 5% by weight, an equivalent weight of 340, an acid number of 2 and a viscosity at 20° C. of 4900 mPa.s at a shear gradient of 147 s$^{-1}$ (commercially available under the name Desmophen 1150 from Bayer AG, Leverkusen, D), 40.00 g of molecular sieve paste having a viscosity at 20° C. of 18,000 mPa.s and consisting of 50% by weight of a zeolite having an average pore diameter of 0.3 nm, in castor oil (commercially available under the name Baylith-L-Paste from Bayer AG, Leverkusen, D), 8.10 g of silica prepared in accordance with Examples 1 to 8, 176.00 g of barium sulphate filler having an average particle size of 8 μm (commercially available under the name Schwerspat [heavy spar] C7 from Sachtleben Chemie GmbH, Duisburg, D), 24.00 g of futile pigment with a titanium dioxide content of 92% by weight (commercially available under the name Kronos RN 57 from Kronos Titan-GmbH, Leverkusen, D) and 2.27 g of a mixed pigment of iron(III) oxide and manganese(III) oxide having an iron(III) oxide content of 59% by weight and an average particle size of 6 μm (commercially available under the name Bayferrox 303T from Bayer AG, Leverkusen, D) are introduced in succession with the dissolver (commercially available under the name Dispermat F105, Getzmann, Reichshof-Heienbach, D) running and the mixture is predispersed at room temperature for 10 min (toothed-disc dissolver having a diameter of 5 cm, speed of rotation 2800 rpm) and then subjected to a main dispersion on the triple roll (Exakt 80 S, Exakt-Apperatebau Otto Herrmann, Norderstedt, D) (roll nip at the front: 2 mm, at the back: 3 mm, speed of rotation 80 rpm, 3 passes).

To determine the "viscosity before storage", the "layer thickness on vertical surfaces before storage" or, the "viscosity after storage" and the "layer thickness on vertical surfaces after storage" after storage at 60° C. for 14 days, 39.60 g of a solvent-free polyisocyanate based on diphenylmethane diisocyanate and having a content of isocyanate groups of 31.5% by weight and a viscosity at 23° C. of 120 mPa.s (commercially available under the name Desmodur VL from Bayer AG, Leverkusen, D) are mixed in at 25° C. over 5 minutes with a mixer having a blade stirrer of 70 mm in diameter (commercially available under the name IKA RW 27 from Janke und Kunkel, D) at 400 rpm. The composition is divided and one part is used to determine the viscosity while the other part is used to determine the layer thickness on vertical surfaces.

Determination of the viscosity: The viscosity of the composition is measured using a Brookfield viscometer RVT DV-II, spindle 6, at 25° C.

Determination of the layer thickness on vertical surfaces: Using stepped doctor blades, the composition is coated onto a black/white contrast card in layer thicknesses of from 600 μm to 2600 μm (subdivided into steps of 100 μm) and the card is placed in a vertical position. The parameter recorded is the layer thickness, in micrometers (μm), at which the applied mass begins to flow before it is fully cured.

The viscosities and the layer thickness on vertical surfaces which are measured before and after storage are compiled in Table 2.

EXAMPLE 29

The procedure of Example 21 is repeated but employing, instead of a silica prepared as in Example 1, a pyrogenic silica which is surface-modified with dimethylsiloxy groups and has a carbon content of 1.0% by weight and a specific surface area of 160 m$^2$/g (measured by the BET method in accordance with DIN 66131 and 66132), and which can be prepared according to DE 42 21 716 (commercially available under the name WACKER HDK H20 from Wacker-Chemie GmbH, Munich, D). The results are given in Table. 2.

EXAMPLE 30

The procedure of Example 21 is repeated but employing, instead of a silica prepared in accordance with Example 1, a pyrogenic silica which is surface-modified with trimethylsiloxy groups and has a carbon content of 2.5% by weight and a specific surface area of 140 m$^2$/g (measured by the BET method in accordance with DIN 66131 and 66132), and which can be prepared according to DE 23 44 388 (commercially available under the name WACKER HDK H2000 from Wacker-Chemie GmbH, Munich, D). The results are given in Table 2.

EXAMPLE 31

The procedure of Example 21 is repeated but employing, instead of a silica prepared in accordance with Example 1, a pyrogenic silica which is surface-modified with ammonium-functional organopolysiloxane and has a carbon content of 5.5% by weight and a specific surface area of 110 m$^2$/g (measured by the BET method in accordance with DIN 66131 and 66132), and which can be prepared according to DE-A 37 07 226 (commercially available under the name WACKER HDK H2050 EP from Wacker-Chemie GmbH, Munich, D). The measured results are given in Table 2.

EXAMPLE 32

The procedure of Example 21 is repeated but employing, instead of a silica prepared in accordance with Example 1, a hydrophilic pyrogenic silica having a specific surface area of 200 m$^2$/g (measured by the BET method in accordance with DIN 66131 and 66132), and which can be prepared according to DE 26 20 737 (commercially available under the name WACKER HDK N20 from Wacker-Chemie GmbH, Munich, D). The results are given in Table 2. Table 2 shows the viscosity (mPa.s) and layer thickness (μm) on vertical surfaces before and after storage for 14 days at 60° C.

TABLE 2

| Examples | (Viscosity (mPa.s)) | | Layer Thickness (μm) | |
|---|---|---|---|---|
| | before storage | after storage | before storage | after storage |
| 21 | 28,200 | 25,100 | 1,800 | 1,700 |
| 22 | 10,800 | 7,900 | <600 | <600 |
| 23 | 27,900 | 24,900 | 1,900 | 1,600 |
| 24 | 9,800 | 6,400 | <600 | <600 |
| 25 | 41,900 | 40,800 | 2,500 | 2,400 |
| 26 | 41,400 | 41,000 | 2,500 | 2,400 |
| 21 | 10,900 | 6,900 | <600 | <600 |
| 28 | 43,000 | 42,300 | 2,500 | 2,500 |
| 29 | 11,000 | 6,000 | <600 | <600 |
| 30 | 8,000 | 4,400 | <600 | <600 |
| 31 | 6,000 | 4,000 | <600 | <600 |
| 32 | 8,000 | 5,500 | <600 | <600 |

EXAMPLES 33 to 40

In order to investigate the thickening effect of the silica in a vinyl ester system, [lacuna] are dispersed (toothed-disc dissolver with a diameter of 5 cm and a circumferential speed of 7.3 m/s) in a dissolver (commercially available under the name Dispermat F105, Getzmann, Reichshof-Heienbach, D) at room temperature for 15 min in 145.50 g of a 40% by weight polyvinyl ester resin dissolved in styrene, having a viscosity of 500 mPa.s at 25° C. (commercially available under the name Palatal A430 from BASF AG, Ludwigshafen, D) and 4.50 g of silica prepared in accordance with Examples 1 to 8. The viscosity of the composition is subsequently measured with a Brookfield viscometer RVT DV-II, spindle 6, at 25° C. The results are compiled in Table 3.

EXAMPLE 41

The procedure of Example 31 is repeated but employing, instead of a silica prepared as in Example 1, a pyrogenic silica which is surface-modified with dimethylsiloxy groups and has a carbon content of 1.0% by weight and a specific surface area of 160 m²/g (measured by the BET method in accordance with DIN 66131 and 66132), and which can be prepared according to DE 42 21 716 (commercially available under the name WACKER HDK H20 from Wacker-Chemie GmbH, Munich,D). The results are given in Table 3.

EXAMPLE 42

The procedure of Example 31 is repeated but employing, instead of a silica prepared in accordance with Example 1, a pyrogenic silica which is surface-modified with trimethylsiloxy groups and has a carbon content of 2.5% by weight and a specific surface area of 140 m²/g (measured by the BET method in accordance with DIN 66131 and 66132), and which can be prepared according to DE 23 44 388 (commercially available under the name WACKER HDK H2000 from Wacker-Chemie GmbH, Munich, D). The results are given in Table 3.

EXAMPLE 43

The procedure of Example 9 is repeated but employing, instead of a silica prepared in accordance with Example 1, a pyrogenic silica which is surface-modified with ammonium-functional organopolysiloxane and has a carbon content of 5.5% by weight and a specific surface area of 110 m²/g (measured by the BET method in accordance with DIN 66131 and 66132), and which can be prepared according to DE-A 37 07 226 (commercially available under the name WACKER HDK H2050 EP from Wacker-Chemie GmbH, Munich, D). The measured results are given in Table 3.

EXAMPLE 44

The procedure of Example 9 is repeated but employing, instead of a silica prepared in accordance with Example 1, a hydrophilic pyrogenic silica having a specific surface area of 200 m²/g (measured by the BET method in accordance with DIN 66131 and 66132), and which can be prepared according to DE 26 20 737 (commercially available under the name WACKER HDK N20 from Wacker-Chemie GmbH, Munich, D). The results are given in Table 3.

TABLE 3

| Examples | Viscosity (mPa.s) |
|---|---|
| 33 | 4,400 |
| 34 | 2,300 |
| 35 | 4,500 |
| 36 | 2,100 |
| 37 | 5,900 |
| 38 | 5,800 |
| 39 | 2,200 |
| 40 | 7,300 |
| 41 | 3,000 |
| 42 | 1,800 |
| 43 | 1,900 |
| 44 | 1,200 |

Appendix I: Extractable silylating agent 25 g of silica are incorporated using a spatula into 100 g of tetrahydrofuran, and subsequently stirred together to a liquid consistency with ice cooling and using a dissolver (Pentraulik laboratory dissolver LD 50 with 40 mm toothed disc), and then sheared at 8400 rpm for 60 sec and equilibrated with ultra-sound for 60 min, and after 2 days a clear filtrate is filtered off by pressure filtration. The filtrate is investigated for its silicon content by atomic absorption spectroscopy (AAS) and, after concentration by a factor of 10, for its content of organosilicon compounds by gas chromatography (GC). Detection limit <100 ppm of organosilicon compounds, based on silica.

Appendix II: Relative sorption capacity for OH—

In accordance with Sears et al., Anal. Chem. 1956, 12, 1981, the content of acidic silanol groups in the silica can be determined by titration with 0.1N sodium hydroxide solution in saturated sodium chloride solution. If this method is applied to highly apolar silica, in general the sorption capacity for hydroxyl ions (OH—) is detected. The relative sorption capacity is then defined as "sorption capacity of the apolar silica divided by the sorption capacity of the hydrophilic starting silica, multiplied by 100".

Appendix III: Methanol number

Apolar silica, especially highly apolar silica, is by definition not wetted by water; this leads to the apolar silica floating on the water below it, even after shaking. Addition of methanol to water lowers the surface tension of the mixture relative to pure water. If the surface tension (mN/m) of the water/methanol mixture is of equal magnitude to the surface energy (mJ/m²) of the silica, the silica is wetted and sinks into the water/methanol mixture. The methanol number is defined as that percentage (% by weight) of methanol in the water/methanol mixture at which half of the silica is wetted and sinks into the liquid. Procedure: Application of an equal volume of silica over the water/methanol mixture, intensive mixing by vigorous shaking for 5 min, then resting for 10 min, followed by assessment of the quantity of silica which has sunk in.

Appendix IV: Thickening effect in UP resin 9 g of each silica are stirred into 141 g of a 66% strength by weight solution of an unsaturated polyester resin in styrene, having an acid number in accordance with DIN 53402 of 31 and a viscosity at 23° C. of 1000 mPa.s (commercially available under the name Ludopal P6 from BASF, Ludwigshafen, D) using a dissolver (Pentraulik laboratory dissolver LD 50 with a 40 mm toothed disc) and are then dispersed at 2800 rpm. The viscosity value at 25° C. measured with a rotary viscometer in accordance with DIN 53019 Part 1 at a shear gradient of 9.7 cm$^{-1}$ is defined as the "thickening effect in UP resin".

Appendix V: Thickening effect in 25% ethanol 15 g of each silica are pasted up in a mixture of 16.7 g of water and 33.3 g of analytical-grade ethanol, then 85 g of water are added and stirred in with the dissolver (Pentraulik laboratory dissolver LD 50 with a 40 mm toothed disc), and the mixture is then dispersed for 5 min at 2800 rpm. The viscosity value at 25° C. measured with a rotary viscometer in accordance with DIN 53019 Part 1 at a shear gradient of 9.7 cm$^{-1}$ is defined as the "thickening effect in 25% ethanol".

What is claimed is:

1. Process for the silylation of very finely divided inorganic oxides, wherein the very finely divided inorganic oxides are treated with at least one silylating agent which is relatively nonvolatile in the temperature range of the overall process, with the proviso that the relatively nonvolatile silylating agent is admixed as a liquid with the very finely divided inorganic oxides, said liquid being in the form of a very finely atomized aerosol.

2. Process for the silylation of very finely divided inorganic oxides according to claim 1, wherein the very finely divided inorganic oxides are additionally treated with at least one silylating agent which is volatile at process temperature, with the proviso that the volatile silylating agent is admixed to the very finely divided inorganic oxides in gaseous form.

3. Process for the silylation of very finely divided inorganic oxides according to claim 1, wherein the process comprises a first step of mixing very finely divided inorganic oxides and silylating agent, a second step of aftertreatment by heat treatment, and a third step of purification in a stream of gas.

4. Process for the silylation of very finely divided inorganic oxides according to claim 1, wherein the process temperature is at temperatures below 400° C.

5. Process for the silylation of very finely divided inorganic oxides according to claim 1, wherein the silylating agent employed comprises one or more organosilicon compounds.

6. Process for the silylation of very finely divided inorganic oxides according to claim 1, wherein the very finely divided inorganic oxide is additionally treated with a protic solvent.

7. Process for the silylation of very finely divided inorganic oxides according to claim 1, wherein the very finely divided inorganic oxide has a carbon content of less than 1% by weight per 100 m$^2$/g of specific surface area.

8. Process for the silylation of very finely divided inorganic oxides according to claim 1, wherein the very finely divided inorganic oxide used is silica.

9. Process for the silylation of very finely divided inorganic oxides according to claim 1, wherein the silylating agent comprises organosilanes of the formula $$R^1_n SiX_{4-n} \tag{I}$$

in which $R^1$ is identical or different and is a monovalent, optionally halogenated, hydrocarbon radical having 1 to 18 carbon atoms, X is identical or different and is a halogen, or OH, OR$^2$, OCOR$^2$, O(CH$_2$)$_x$OR$^2$, $R^2$ is identical or different and is a monovalent hydrocarbon radical having 1 to 8 carbon atoms, n is 1, or 2, and x is 1, 2, 3;

organosiloxanes of the formula $$(R^1_a X_b SiO_{1/2})_z (R^1_2 SiO_{2/2})_x (R^3 R^1 SiO_{2/2})_y (SiX_b R^1_a)_z \tag{II}$$

in which $R^1$ is as defined above, $R^2$ is as defined above $R^3$ is identical or different, and is a hydrogen or a monovalent, optionally halogenated, hydrocarbon radical having 1 to 18 carbon atoms which is different from $R^1$, X is as defined above, a is 0, 1, 2 or 3, b is 0, 1, 2 or 3, the sum a+b being equal to 3, x is 0 or an integer from 1 to 200, y is 0 or an integer from 1 to 200, and the sum x+y being equal to 0 or an integer between 1 and 200, z is 0 or 1 with the proviso that z is greater than 0 if the sum x+y is equal to 0, and mixtures of formulae (I) and (II).

* * * * *